UNITED STATES PATENT OFFICE.

RICHARD HERZ, OF FRANKFORT-ON-THE-MAIN, GERMANY, ASSIGNOR TO LEOPOLD CASSELLA & CO., OF FRANKFORT-ON-THE-MAIN, GERMANY.

BLUE SULFUR DYE AND PROCESS OF MAKING SAME.

SPECIFICATION forming part of Letters Patent No. 723,154, dated March 17, 1903.

Application filed October 25, 1902. Serial No. 128,810. (No specimens.)

*To all whom it may concern:*

Be it known that I, RICHARD HERZ, a citizen of Prussia, and a resident of Frankfort-on-the-Main, in the Province of Hesse-Nassau, Kingdom of Prussia, Germany, have invented a certain new and useful Blue Sulfur Dye and Process of Making Same, of which the following is a specification.

I have found that very valuable blue dyestuffs dyeing cotton direct can be produced by heating the hitherto-unknown phenylparaamido paraoxydiphenylamin with polysulfids. The paraämido paraoxydiphenylamin is obtained by reducing the product of oxidation of equimolecular proportions of para-amidodiphenylamin and phenol or equimolecular proportions of paraämidophenol and diphenylamin.

The following are examples of the processes which I may employ in carrying out my invention:

Example I. 18.5 kilos paraämidodiphenylamin are dissolved in three hundred liters water and 12.5 kilos hydrochloric acid of 20° Baumé. 9.4 kilos phenol dissolved in two hundred liters water are added, and twenty kilos sodium bichromate in two hundred liters water and sixty kilos acetic acid of fifty per cent. are introduced into the well-cooled solution with constant stirring. As soon as the oxidation is complete soda is added until the whole shows a slightly-alkaline reaction, when seventy-five kilos of crystallized sodium sulfid are added. This solution is then heated for some hours to 40° to 50° centigrade, brought to the boil, and the boiling solution is filtered off. On cooling, the phenylamidoöxydiphenylamin crystallizes from the filtrate in silvery shining crystals. It is almost insoluble in cold, very difficultly soluble in hot water, easily soluble in caustic alkalies. Alkaline solutions rapidly turn blue on exposure to air. The base is easily soluble in alcohol, rather difficultly soluble in benzene, and easily obtainable chemically pure by recrystallization from this solvent. Its melting-point has been found to be about 150° centigrade.

Example II: 27.6 kilos phenylamido paraoxydiphenylamin are dissolved in one hundred and fifty liters alcohol. Fifty-five kilos dry sodium pentasulfid are then introduced, and the whole is boiled for twenty-four hours in a vessel provided with a reflux condenser. The alcohol is then distilled off and the residue dissolved in water. The leuco compound of the coloring-matter so formed goes into solution, which is then filtered and the coloring-matter separated from the filtrate by oxidation—for instance, by means of a current of air. The dyestuff thus obtained when dry is in the form of a dark-blue powder insoluble in water.

Example III: Sixty kilos sodium sulfid and thirty kilos sulfur are melted together, and as soon as the sulfur has dissolved twenty kilos phenylamidoöxydiphenylamin are introduced. The temperature of the melt is then raised to 140° to 150° centigrade and kept at this point for two to three hours. The melt is then introduced into salt water of 20° Baumé, which effects the separation of the coloring-matter. It is filtered off, washed out with diluted salt water, pressed, and dried. The thus-produced dyestuff forms a dark-blue powder, insoluble in water, almost insoluble in alcohol, soluble with a dark-blue color in concentrated sulfuric acid. It is easily soluble in water in presence of alkaline sulfids with a greenish-blue color. On boiling the solution turns into a pale yellowish-green shade. It dyes unmordanted cotton bright indigo-blue shades, which are fast to washing, acids, and light.

Having thus described my invention and in what manner it may be carried out, what I claim as my invention, and desire to secure by Letters Patent, is—

1. The manufacture of blue sulfur dyestuffs by heating phenylamidoöxydiphenylamin of the formula

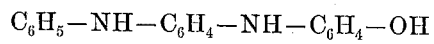

$$C_6H_5-NH-C_6H_4-NH-C_6H_4-OH$$

with polysulfids substantially as described.

2. The blue coloring-matter hereinbefore described which is a dark-blue powder soluble in water in the presence of alkaline sulfids with a greenish-blue color, dissolving in concentrated sulfuric acid with a dark-blue color, dyeing unmordanted cotton indigo-blue shades fast to washing, acids, and light, substantially as described.

Signed at Frankfort-on-the-Main, in the Province of Hesse-Nassau, Kingdom of Prussia, Germany, this 9th day of October, A. D. 1902.

RICHARD HERZ.

Witnesses:
JEAN GRUND,
CARL GRUND.